(12) United States Patent
Park

(10) Patent No.: US 10,116,253 B2
(45) Date of Patent: Oct. 30, 2018

(54) SOLAR POWER GENERATING DEVICE

(71) Applicant: LG INNOTEK CO., LTD., Seoul (KR)

(72) Inventor: Kyung Eun Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 256 days.

(21) Appl. No.: 15/028,630

(22) PCT Filed: Oct. 10, 2014

(86) PCT No.: PCT/KR2014/009534
§ 371 (c)(1),
(2) Date: Apr. 11, 2016

(87) PCT Pub. No.: WO2015/053587
PCT Pub. Date: Apr. 16, 2015

(65) Prior Publication Data
US 2016/0254777 A1    Sep. 1, 2016

(30) Foreign Application Priority Data
Oct. 10, 2013    (KR) .................. 10-2013-0120500

(51) Int. Cl.
*H02S 20/32*    (2014.01)
*F24S 50/20*    (2018.01)
(Continued)

(52) U.S. Cl.
CPC .............. *H02S 20/32* (2014.12); *F24S 25/30* (2018.05); *F24S 30/42* (2018.05); *F24S 50/00* (2018.05);
(Continued)

(58) Field of Classification Search
CPC ........ H02S 20/32; F24J 2/5203; F24J 2/5403; F24J 2/40; F24J 2/38; F24J 2002/5462; F24S 50/20; F24S 50/00
See application file for complete search history.

(56) References Cited

U.S. PATENT DOCUMENTS 4,000,734 A * 1/1977 Matlock ............... F24S 23/74
126/576
4,103,672 A * 8/1978 Meyer ................... F24J 2/145
126/603
(Continued)

FOREIGN PATENT DOCUMENTS

CN    101908841 A    12/2010
CN    102439731 A    5/2012
(Continued)

OTHER PUBLICATIONS

Office Action dated Nov. 16, 2016 in Chinese Application No. 2014800664640.
(Continued)

*Primary Examiner* — Golam Mowla
(74) *Attorney, Agent, or Firm* — Saliwanchik, Lloyd & Eisenschenk

(57) ABSTRACT

The solar power generating device according to the present invention comprises: solar cell modules disposed in a plurality of rows and columns; and an inclination control member for controlling the inclination angle of all the solar cell modules at a time, wherein the inclination control member comprises: a support part for supporting the solar cell modules; a control part, disposed on the support part, for controlling the inclination angle of the solar cell modules; and a driving part for driving the control part. In the solar power generating device according to an embodiment, the solar cell modules connected to the support unit can be vertically moved at one time by the inclination control member. In other words, the inclination control member can vertically control the plurality of solar cell modules, which are connected to the inclination control member, at a time according to the altitude of the sun so as to optimize the incident light.

13 Claims, 4 Drawing Sheets

(51) Int. Cl.
*F24S 50/00* (2018.01)
*F24S 25/30* (2018.01)
*F24S 30/42* (2018.01)
*F24S 30/00* (2018.01)

(52) U.S. Cl.
CPC ......... *F24S 50/20* (2018.05); *F24S 2030/134* (2018.05); *F24S 2030/14* (2018.05); *Y02E 10/47* (2013.01)

(56) References Cited

U.S. PATENT DOCUMENTS

| | | | | |
|---|---|---|---|---|
| 4,138,994 | A * | 2/1979 | Shipley, Jr. | F24S 40/52 126/694 |
| 4,159,710 | A * | 7/1979 | Prast | F24S 50/20 126/582 |
| 4,173,213 | A * | 11/1979 | Kelly | H02S 40/44 126/604 |
| 4,184,482 | A * | 1/1980 | Cohen | F24J 2/145 126/605 |
| 4,187,123 | A * | 2/1980 | Diggs | G01S 3/7861 136/206 |
| 4,316,448 | A * | 2/1982 | Dodge | H01L 31/0547 126/600 |
| 4,345,582 | A * | 8/1982 | Aharon | F24S 23/70 126/574 |
| 4,365,617 | A * | 12/1982 | Bugash | F28D 20/0052 126/578 |
| 4,370,974 | A * | 2/1983 | Maxey | F24S 23/80 126/621 |
| 4,404,465 | A * | 9/1983 | Miller | G01S 3/7861 250/203.4 |
| 4,429,178 | A * | 1/1984 | Prideaux | H01L 31/0547 136/246 |
| 4,585,318 | A * | 4/1986 | Seifert | H02S 20/32 353/3 |
| 4,644,933 | A * | 2/1987 | Gregory | F24S 23/00 126/601 |
| 4,765,309 | A * | 8/1988 | Legge | F24J 2/38 126/570 |
| 4,832,001 | A * | 5/1989 | Baer | H02S 20/30 126/579 |
| 4,966,631 | A * | 10/1990 | Matlin | H02S 20/10 136/244 |
| 4,995,377 | A * | 2/1991 | Eiden | F24J 2/5431 126/605 |
| 5,542,409 | A * | 8/1996 | Sampayo | F24S 23/77 126/606 |
| 5,632,823 | A * | 5/1997 | Sharan | H02S 20/32 136/246 |
| 5,730,117 | A * | 3/1998 | Berger | F24S 50/20 126/604 |
| 6,058,930 | A * | 5/2000 | Shingleton | F24S 30/425 126/600 |
| 7,888,588 | B2 * | 2/2011 | Shingleton | H02S 20/32 136/246 |
| 8,407,950 | B2 * | 4/2013 | Hartelius | H02S 20/00 52/173.3 |
| 8,459,249 | B2 * | 6/2013 | Corio | H02S 20/32 126/600 |
| 2003/0070705 | A1 * | 4/2003 | Hayden | F24J 2/5232 136/251 |
| 2010/0307564 | A1 | 12/2010 | Park | |
| 2011/0259396 | A1 | 10/2011 | Hoffman | |
| 2013/0037099 | A1 | 2/2013 | Lee | |

FOREIGN PATENT DOCUMENTS

| | | |
|---|---|---|
| CN | 103081123 A | 5/2013 |
| JP | 2013-187531 A | 9/2013 |
| KR | 10-0970961 B1 | 7/2010 |
| KR | 10-2011-0096734 A | 8/2011 |
| KR | 10-2012-0076732 A | 7/2012 |
| WO | WO-2011-102618 A2 | 8/2011 |

OTHER PUBLICATIONS

International Search Report in International Application No. PCT/KR2014/009534, filed Oct. 10, 2014.

* cited by examiner

[Fig. 1]
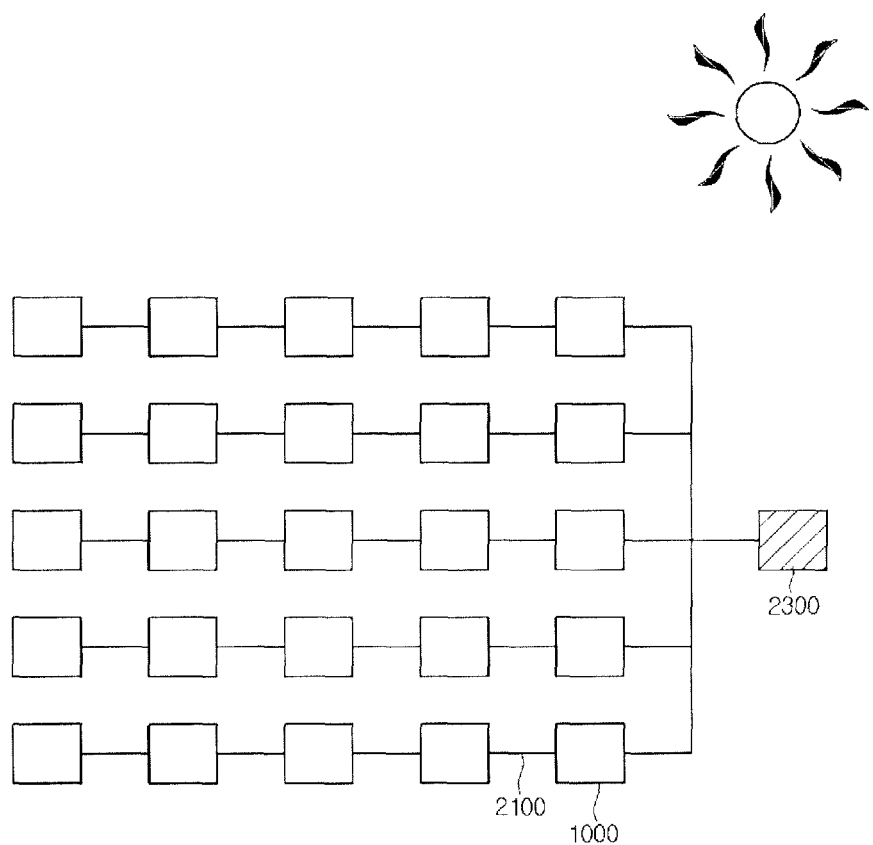

[Fig. 2]
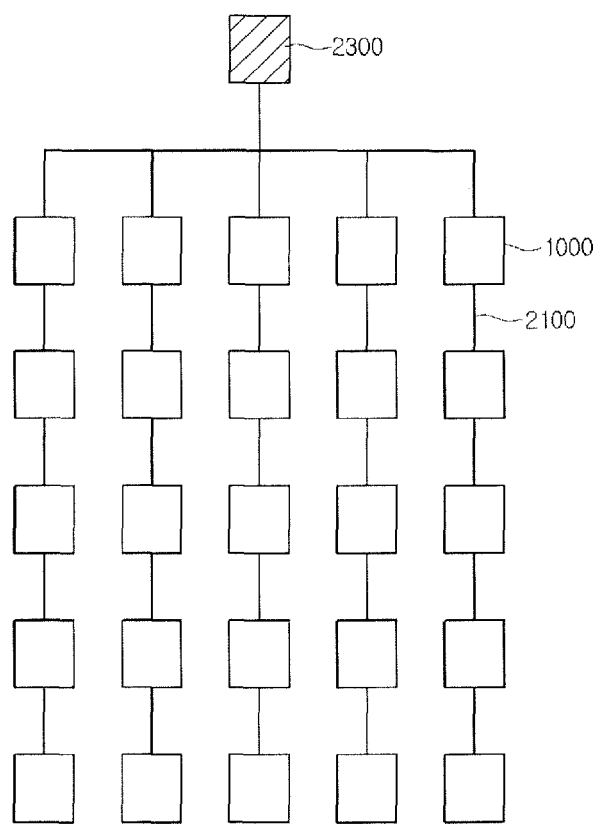

[Fig. 3]
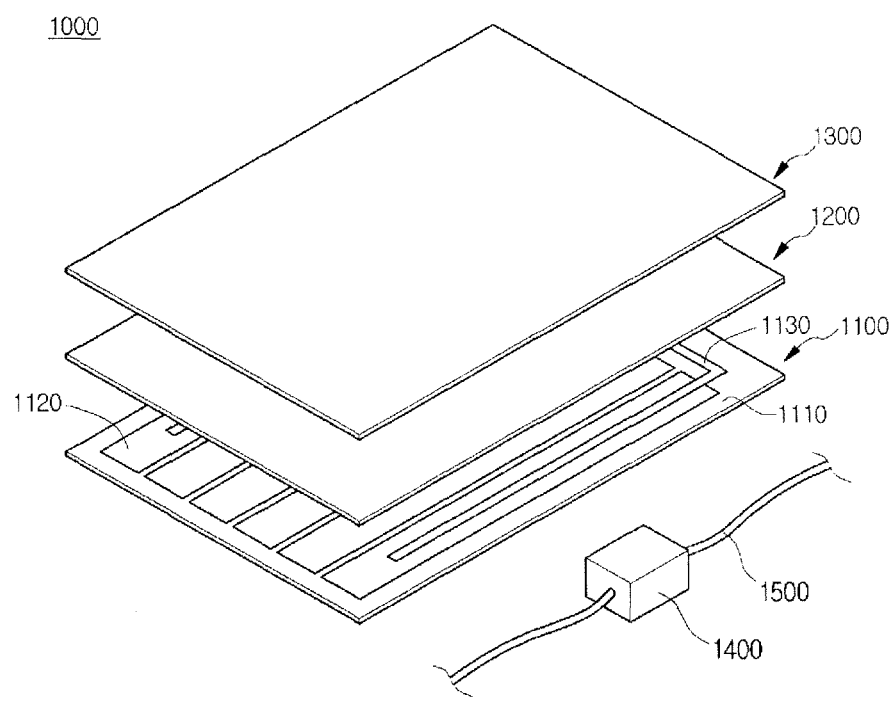
[Fig. 4]
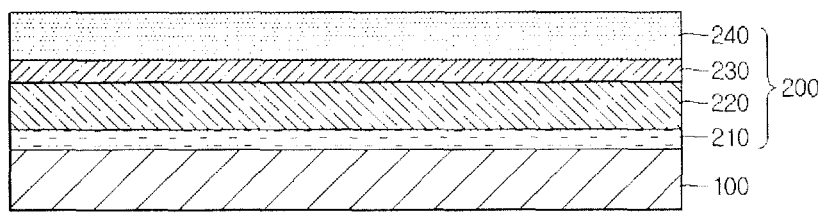

[Fig. 5]
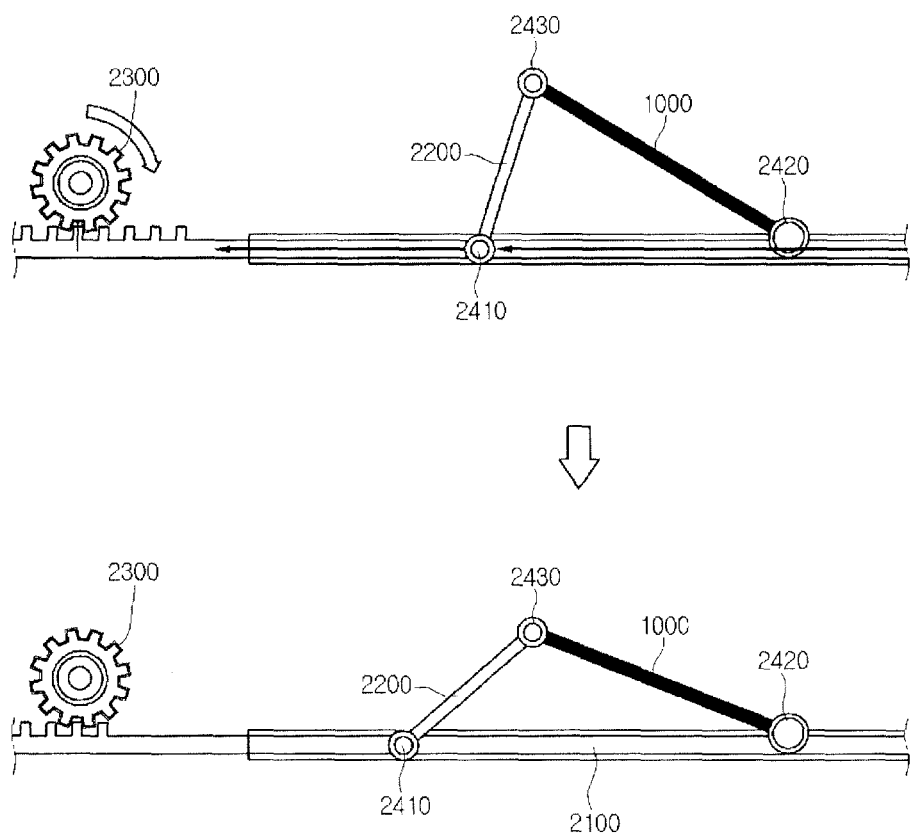

SOLAR POWER GENERATING DEVICE

CROSS-REFERENCE TO RELATED APPLICATIONS

This application is the U.S. national stage application of International Patent Application No. PCT/KR2014/009534, filed Oct. 10, 2014, which claims priority to Korean Application No. 10-2013-0120500, filed Oct. 10, 2013, the disclosures of each of which are incorporated herein by reference in their entirety.

TECHNICAL FIELD

The embodiment relates to a solar power generating device.

BACKGROUND ART

Recently, the development of new renewable energy has become more important and interested due to the serious environmental pollution and the lack of fossil fuel. Among the new renewable energy, a solar cell is spotlighted as a pollution-free energy source for solving the future energy problem because it rarely causes environmental pollution and has the semi-permanent life span and there exists infinite resources for the solar cell.

A solar cell may be defined as a device to convert light energy into electrical energy by using a photovoltaic effect of generating electrons when light is incident onto a P-N junction diode. In addition, a modularized solar cell is called a PV module (photovoltaic module).

As described above, since the solar cell uses solar energy, it is required to obtain solar energy from the sun as much as possible to improve the efficiency of the solar cell.

When taking into consideration the revolution of the sun for a day, that is, the diurnal motion of the sun, as generally known, the sun rises in the east and sets in the west. In other words, an angle of sun light absorbed by the solar cell is varied over time.

Meanwhile, a solar cell according to the related art has a problem in that the solar cell remains at a constant angle. That is, the duration of sunshine is about 3 hours to 4 hours in summer and about 2 hours to 3 hours in other seasons. Thus, to improve the efficiency, it is necessary to increase the incident angle of sunlight upon the solar cell at a maximum level as long as possible in the duration of sunshine.

To solve the above problems, an incident plane of a solar cell module or incident planes of solar cell modules fixed to one member may be controlled according to the incident angle of sunlight. However, in this case, since each solar cell module must be rotated, the efficiency may be deteriorated.

DISCLOSURE

Technical Problem

The embodiment provides a solar power generating device which may be easily manufactured and have improved power generation efficiency.

Technical Solution

According to the embodiment, there is provided a solar power generating device which includes solar cell modules arrange as a plurality of rows and columns; and an inclination control member to control inclination angles of the solar cell modules at a time, wherein the inclination control member includes a support unit to support the solar cell modules; a control unit disposed on the support unit to control the inclination angles of the solar cell modules; and a driving unit to operate the control unit.

Advantageous Effects

According to the solar power generating device of the embodiment, the solar cell modules connected to the support unit may move up or down at a time by the inclination control member. That is, the inclination control member may control the solar cell modules connected thereto such that all the solar cell modules move up or down in match with the solar altitude, thereby optimizing the incident light at a time according to the solar altitude.

Thus, the solar power generating device according to the embodiment may easily control a position of the solar cell module such that the solar cell receives sunlight as much as possible.

In addition, since it is possible to control all the solar cell modules through the inclination control member at a time, the process efficiency may be improved.

Therefore, according to the solar power generating device of the embodiment, the cost of driving the solar power generating device may be reduced and in addition, the power producing efficiency of the solar power generating device may be improved.

DESCRIPTION OF DRAWINGS

FIGS. 1 and 2 are a layout views showing solar cell modules of a solar power generating device according to the embodiment.

FIG. 3 is a view illustrating one example of the solar cell module included in the solar power generating device according to the embodiment.

FIG. 4 is a view illustrating one example of the solar cell panel included in the solar power generating device according to the embodiment.

FIG. 5 is a view showing a solar power generating device which moves according to a position of the sun according to the embodiment.

BEST MODE

Mode for Invention

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

The thickness and size of each layer (or film), each region, each pattern, or each structure shown in the drawings may be exaggerated, omitted or schematically drawn for the purpose of convenience or clarity. In addition, the size of elements does not utterly reflect an actual size.

Hereinafter, the embodiments of the present invention will be described in detail with reference to accompanying drawings.

Hereinafter, a solar power generating device according to an embodiment will be described with reference to FIGS. 1 to 5. FIGS. 1 and 2 are a layout views showing solar cell modules of a solar power generating device according to the embodiment. FIG. 3 is a view illustrating one example of the solar cell module included in the solar power generating device according to the embodiment. FIG. 4 is a view illustrating one example of the solar cell panel included in the solar power generating device according to the embodiment. FIG. 5 is a view showing a solar power generating device which moves according to a position of the sun according to the embodiment.

Referring to FIGS. 1 and 2, a solar power generating device according to an embodiment may include solar cell modules 1000 arranged in rows and columns, and an inclination control member 2000 for controlling inclined angles of the solar cell modules 1000.

Referring to FIGS. 3 and 4, each of the solar cell modules 1000 may include a solar cell panel 1100, a protective layer 1200, an upper substrate 1300, a junction box 1400, and a cable 1500.

The solar cell panel 1100 may have a flat shape. The solar cell panel 1100 may include a support substrate 1110, a plurality of solar cells 1120, and two bus bars 1130.

The support substrate 1110 may include an insulator. The support substrate 1110 may be a glass substrate or a plastic substrate. The support substrate 100 may have a flat shape. The support substrate 1110 may be flexible or rigid.

In addition, the solar cells 1210 may be disposed on the support substrate 1110.

For example, the solar cells 1120 may be CIGS-based solar cells, silicon-based solar cells, dye-sensitized solar cells, group II-VI compound semiconductor solar cells, or group III-V compound semiconductor solar cells.

For example, as shown in FIG. 3, the solar cell 1120 may be a CIGS-based solar cell. In detail, the solar cell 1120 may include a back electrode layer 1121 disposed on the support substrate 1110, a light absorbing layer 1122 disposed on the back electrode layer 1121, a buffer layer 1123 disposed on the light absorbing layer 1122, and a front electrode layer 1124 disposed on the buffer layer 1123.

The back electrode layer 1121 may be a conductive layer. For example, the back electrode layer 1121 may include metal such as molybdenum (Mo).

The light absorbing layer 1122 includes group I-III-VI compounds. For instance, the light absorbing layer 1122 may include the Cu (In,Ga)Se$_2$ (CIGS) crystal structure, the Cu(In)Se$_2$ crystal structure, or the Cu(Ga)Se$_2$ crystal structure.

The buffer layer 1123 may include CdS or ZnO.

The front electrode layer 1124 may include oxide. For example, a material constituting the front electrode layer 1124 may include aluminum doped zinc oxide (AZO), indium zinc oxide (IZO) or indium tin oxide (ITO).

The solar cells 1120 are arranged in the shape of a stripe. Alternatively, the solar cells 1120 may be arranged in various forms such as a matrix form. The solar cells 1120 may be connected in series or parallel to each other.

The bus bars 1130 are disposed on the solar cell 1120. The bus bars 1130 are connected to the solar cell 1120. In detail, the bus bars 1130 may be directly connected to the solar cell 1120. In more detail, the bus bars 1130 may be connected to the outmost solar cells 1120, respectively.

The bus bars 1130 may include a conductive tape or a conductive paste. For example, a material constituting the bus bars 1130 may include copper, silver or aluminum.

The protective layer 1200 is integrally formed with the support substrate 1110 through a lamination process in the state that the protective layer 1110 is provided on the solar cell 1120. In addition, the protective layer 1200 protects the solar cell 1120 from being corroded due to moisture infiltration, and protects the solar cell 1120 from the shock. The protective layer 1200 may include ethylene vinyl acetate (EVA). The protective layer 1200 may be provided under the support substrate 1110.

The upper substrate 1300 provided on the protective layer 1200 includes tempered glass representing high transmittance and having a superior anti-breakage function. In this case, the tempered glass may include low iron tempered glass including the low content of iron.

A junction box 1400 may be further disposed below the support substrate 1110. The junction box 1400 may include a diode and may contain a circuit substrate connected to the bus bar 1130 and a cable 1500.

Referring to FIGS. 1 and 2, the solar cell modules 1000 may be arranged in rows or columns. In addition, the solar cell modules 1000 may be disposed on the inclination control member 2000.

The inclination control member 2000 may connect the solar cell modules 1000 to the solar cell module in rows or columns.

In detail, referring to FIG. 1, the solar cell modules 1000 may be connected to each other in a row (horizontal) direction through the inclination control member 2000. In addition, referring to FIG. 2, the solar cell modules 1000 may be connected to each other in a column (vertical) direction through the inclination control member 2000.

Referring to FIG. 5, the inclination control member 2000 may include a support unit 2100, a control unit 2200 and a driving unit 2300.

The support unit 2100 may support the solar cell modules 1000. In detail, the solar cell modules 1000 may be connected to each other in a row or column direction through the support unit 2100.

The support unit 2100 may include a rail. In detail, the support unit 2100 may have a rail shape such that the solar cell module 1000 is movable.

The control unit 2200 may be coupled to the support unit 2100. The control unit 2200 may be coupled to the support unit 2100 to control an inclined angle of the solar cell module 1000.

One end of the control unit 2200 may be coupled to the support unit 2100. In addition, the opposite end of the control unit 2200 may be coupled to the solar cell module 1000.

In addition, one end of the solar cell module 1000 may be coupled to the support unit 2100. In addition, the opposite end of the solar cell module 1000 may be coupled to the control unit 2200.

That is, the control unit 2200 and the solar cell module 1000 may be movable at the same time. In detail, when the control unit 2200 moves, the solar cell module 1000 may move. When the solar cell module 1000 moves, the control unit 2200 may move together.

The solar cell module 1000 and the control unit 2200 include a rotational unit 2400. In detail, the control unit 2200 may include a first rotational unit 2410. In addition, the solar cell module 1000 may include a second rotational unit 2420. In addition, a third rotational unit 2430 connecting the solar cell module 1000 to the control unit 2200 may be included.

The first and second rotational units 2410 and 2420 may be coupled to the support unit 2100. In detail, the first and second rotational units 2410 and 2420 may be movably coupled to the support unit 2100.

The first and second rotational units 2410 and 2420 may have curved surfaces. In detail, the first and second rotational units 2410 and 2420 may have a circular shape. For example, the first and second rotational units 2410 and 2420 may have a wheel shape.

Thus, the solar cell module 1000 and the control unit 2200 may be coupled to the support unit 2100 and may be movable along the support unit 2100 by the first and second rotational units 2410 and 2420.

The driving unit 2300 may be connected to the support unit 2100. In detail, the driving unit 2300 may be connected to the control unit 2200. In more detail, the driving unit 2300 may be connected to the first rotational unit 2410 coupled to the support unit 2100.

The driving unit 2300 may move the first and second rotational units 2410 and 2420. In detail, the driving unit 2300 may move the first rotational unit 2410.

The driving unit 2300 may move the first rotational unit 2410 according to the solar altitude. As the first rotational unit 2410 moves, the control unit 2200 may move along rail in a first or second direction. In addition, as the first rotational unit 2410 moves, the solar cell module 1000 connected to the support unit 2100 and the control unit 2200 may move together.

That is, as the driving unit 2300 is operated, the first rotational unit 2410 moves in the first or second direction. As the first rotational unit 2410 moves, the solar cell module 1000 connected to the support unit 2100 and the control unit 2200 may move in the first or second direction by the second rotational unit 4220. That is, as the support unit 2100 and the solar cell module 1000 may move through the first and second rotational units 2410 and 2420 in the first or second direction as the driving unit 2300 is operated.

The first and second rotational units 2410 and 2420 may move in mutually opposite directions. In detail, when the first rotational unit 2410 moves in the first direction, the second rotational unit 24200 may move in the second direction. When the first rotational unit 2410 moves in the second direction, the second rotational unit 24200 may move in the first direction.

In other words, the control unit 2200 and the solar cell module 1000 may move in mutually opposite directions. In detail, when the control unit 2200 moves in the first direction, the solar cell module 1000 may move in the second direction. When the control unit 2200 moves in the second direction, the solar cell module 1000 may move in the first direction.

The solar cell module 1000 may move on the support unit 2100 in an up or down direction by the first and second rotational units 2410 and 2420.

That is, according to the solar power generating device of the embodiment, the solar cell modules 1000 connected to the support unit 2100 may move up or down at a time by the inclination control member 2000. That is, the inclination control member 2000 may control the solar cell modules 1000 connected thereto such that all solar cell modules 1000 move up or down in match with the solar altitude, thereby optimizing the incident light at a time according to the solar altitude.

Thus, the solar power generating device according to the embodiment may easily control a position of the solar cell module such that the solar cell receives sunlight as much as possible.

In addition, since it is possible to control all the solar cell modules through the inclination control member at a time, the process efficiency may be improved.

Therefore, according to the solar power generating device of the embodiment, the cost of driving the solar power generating device may be reduced and in addition, the power producing efficiency of the solar power generating device may be improved.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A solar power generating device comprising:
   solar cell modules arrange as a plurality of rows and columns; and
   an inclination control member to control inclination angles of the solar cell modules at a time,
   wherein the inclination control member comprises:
   a support unit to support the solar cell modules;
   a control unit disposed on the support unit to control the inclination angles of the solar cell modules; and
   a driving unit to operate the control unit,
   wherein the solar cell module includes a silicon-based solar cell,
   wherein the support unit includes a rail,
   one end of the control unit is coupled to the support unit and an opposite end of the control unit is coupled to the solar cell module, and
   one end of the solar cell module is coupled to the support unit and an opposite end of the solar cell module is coupled to the control unit,
   wherein the control unit includes a first rotational unit coupled to the support unit, and
   the solar cell module includes a second rotational unit coupled to the support unit,
   the solar power generating device further comprising a third rotational unit to connect the solar cell module to the control unit.

2. The solar power generating device of claim 1, wherein the first and second rotational units include curved surfaces.

3. The solar power generating device of claim 1, wherein the driving unit moves the first and second rotational units.

4. The solar power generating device of claim 3, wherein the first and second rotational unit move in mutually opposite directions.

5. The solar power generating device of claim 3, wherein the driving unit moves the first and second rotational units according to a solar altitude.

6. The solar power generating device of claim 3, wherein the second rotational unit moves the solar cell module up and down.

7. The solar power generating device of claim 1, wherein the solar cell modules are connected to each other in rows or columns by the inclination control member.

8. The solar power generating device of claim 1, wherein the support unit and the solar cell module simultaneously move.

9. The solar power generating device of claim 1, wherein the first and second rotational units are movably connected to the support unit.

10. The solar power generating device of claim 1, wherein the control unit and the solar cell module move in mutually opposite directions.

11. The solar power generating device of claim 1, wherein the solar cell module includes a support substrate and a solar cell on the support substrate, and
wherein the solar cell includes:
a back electrode layer on the support substrate;
a light absorbing layer on the back electrode layer;
a buffer layer on the light absorbing layer; and
a front electrode layer on the buffer layer.

12. The solar power generating device of claim 1, wherein the first and second rotational units have a circular shape.

13. The solar power generating device of claim 1, wherein the control unit and the solar cell module simultaneously move.

* * * * *